United States Patent [19]

Pasini

[11] 4,179,036
[45] Dec. 18, 1979

[54] MOTOR VEHICLE FUEL TANK

[75] Inventor: Luciano Pasini, Milan, Italy

[73] Assignee: Alfa Romeo S.p.A., Milan, Italy

[21] Appl. No.: 923,381

[22] Filed: Jul. 10, 1978

[30] Foreign Application Priority Data

Jul. 27, 1977 [IT] Italy ................. 26205 A/77

[51] Int. Cl.² ............... B65D 87/12; B65D 87/46; F17D 1/00
[52] U.S. Cl. .................. 220/22; 220/20.5; 137/574
[58] Field of Search ............. 220/21, 205, 22, 85 S, 220/85 VR, 85 VS, 85 P, 86 R; 137/574, 582; 251/127

[56] References Cited

U.S. PATENT DOCUMENTS

| | | | |
|---|---|---|---|
| 1,701,490 | 2/1929 | Carter | 220/22 |
| 2,094,437 | 9/1937 | Walker | 220/22 |
| 3,020,950 | 2/1962 | Schraivogel | 137/574 X |
| 3,049,171 | 8/1962 | Neuerburg et al. | 137/574 X |
| 4,077,884 | 3/1978 | Naumann | 220/22 X |

*Primary Examiner*—Steven M. Pollard
*Attorney, Agent, or Firm*—Holman & Stern

[57] ABSTRACT

This invention relates to a fuel tank for a motor vehicle provided with an internal combustion engine, in which means are provided for preventing depriming of the pump which conveys the fuel to the engine feed circuit. According to the invention, the mouth of a fuel withdrawal conduit is situated in a small chamber contained in the tank, bounded laterally by a baffle and communicating with the remaining part of the tank through at least one gap in the baffle. This gap extends in the form of a channel formed by parallel walls disposed side-by-side over a length substantially equal to the chamber dimension in the direction parallel to the side-by-side walls.

7 Claims, 8 Drawing Figures

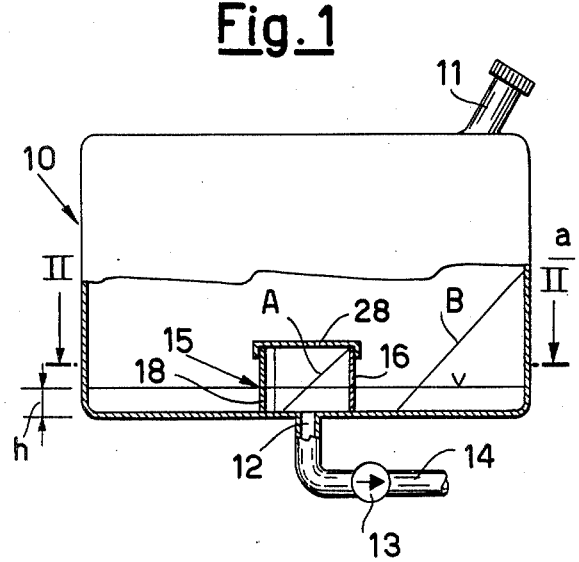
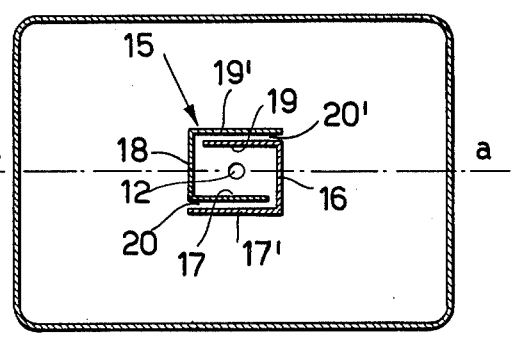
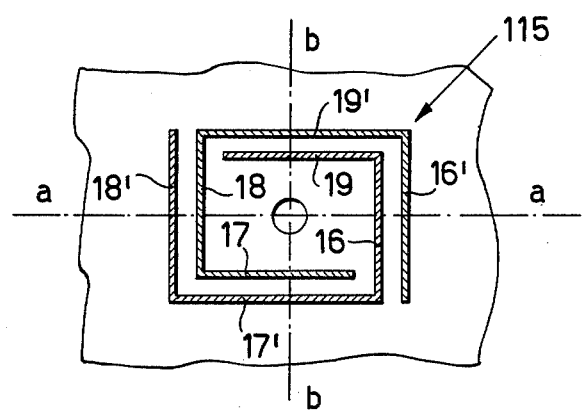
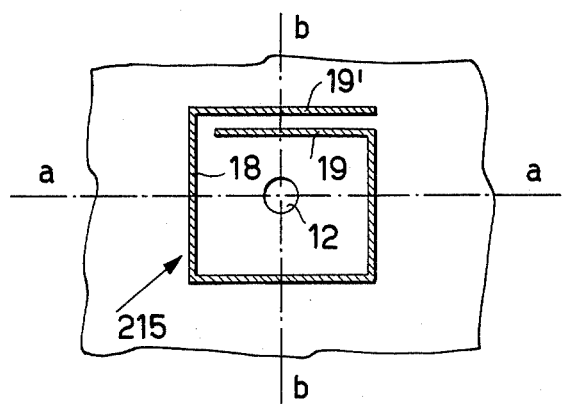

MOTOR VEHICLE FUEL TANK

This invention relates to a fuel tank for a motor vehicle fitted with an internal combustion engine, and in which means are provided for preventing depriming of the pump which conveys the fuel to the engine feed circuit.

If the fuel level in the tank is very low, there is a danger that the pump can become deprimed under certain vehicle running conditions, such as on bends taken at high speed or in the case of very sudden acceleration or braking, because the liquid mass is subjected to a high inertia force which urges it towards the side walls of the tank.

Under these conditions, especially if the tank dimensions are large in the inertia force direction, it can happen that the mouth of the pump suction conduit becomes uncovered, and the pump sucks dry. A situation of this kind is very dangerous because not only can it damage the pump, but in particular the fuel feed to the engine can cease and the engine can stop.

It has been proposed to provide fuel tanks with internal baffles which limit and slow down the displacements of the liquid mass due to the action of inertia forces, but particularly severe operating situations can arise such as very fast and very long bends, in which normal screening is insufficient to prevent depriming of the pump.

The object of the present invention is to solve this problem by providing the tank with means which prevent the pump from depriming even under limiting vehicle running conditions, i.e. with a minimum fuel level, with maximum acceleration, and with prolonged duration of the disturbing phenomena.

This object is attained by a motor vehicle fuel tank, wherein the mouth of the fuel suction conduit is situated in a small chamber contained in the tank, bounded by a baffle and communicating with the rest of the tank via at least one gap in the baffle, this gap being bounded by parallel walls disposed side-by-side over a length substantially equal to the chamber dimension in the direction parallel to the side-by-side walls.

The objects and characteristics of the improved tank according to the invention will be more apparent from the description given by way of example hereinafter of some embodiments, illustrated in the accompanying drawings in which:

FIG. 1 is an elevational view of a tank containing the device according to the invention;

FIG. 2 is a section on the line II—II of FIG. 1;

FIGS. 3 and 4 show a detail of two different embodiments in a view analogous to that of FIG. 2;

Figure 5:
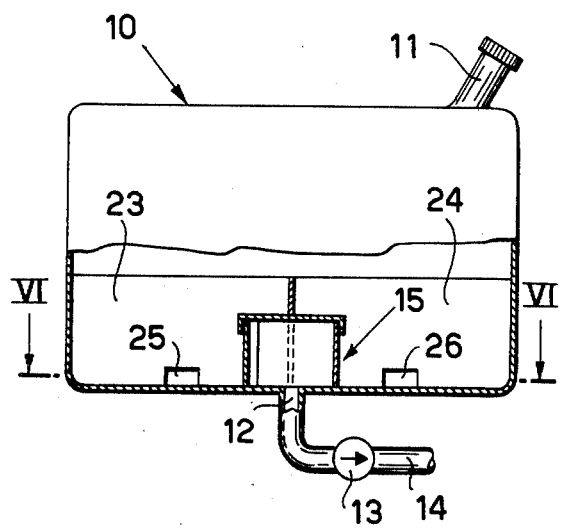

FIGS. 5 and 6 and FIGS. 7 and 8 are views, analogous to the views shown in FIGS. 1 and 2, of two different embodiments of the invention.

FIGS. 1 and 2 show one particularly functional embodiment of the invention.

A fuel tank, indicated overall by 10, is provided with a filling nozzle 11 and a fuel outlet conduit 12, which opens at the base of the tank and supplies a pump 13, the delivery conduit 14 of which is connected in known manner to the feed device, not shown, of an internal combustion engine.

On the base of the tank there is provided a compartment indicated by 15, disposed in a position corresponding with the mouth of the conduit 12. This compartment constitutes a chamber bounded by walls 16, 17, 18 and 19. The interior of the chamber 15 communicates with the rest of the tank via a gap between the walls 16 and 17 and a further gap between the walls 18 and 19. These gaps take on the form of channels extending respectively as passages 20 and 20' formed by walls 17' and 19' facing the walls 17 and 19. One advantage of the embodiment described here is that the walls of the compartment 15 are in practice formed by two analogous U elements, 17-18-19' and 19-16-17' respectively.

A cover 28 closes the top of the compartment 15.

The described embodiment is able to hold the fuel at the suction mouth of the conduit 12 even when the tank is subject to transverse acceleration, i.e. in the direction of the straight line a—a.

In this respect, it is apparent that the liquid is disposed in the compartment with its free surface normal to the resultant of the transverse acceleration and the acceleration due to gravity, and emerges only when the free surface intersects the gap in the walls.

For example, it will be assumed that liquid is contained under still conditions in the tank up to a level h. If the tank is subjected to transverse acceleration directed towards the right in FIG. 1 and having a value equal to the acceleration due to gravity, the liquid collects with its free surface at 45° to the horizontal, both within the compartment 15 (free surface A) and against the side wall of the tank (free surface B). It is apparent that even under such a critical condition the feed to the conduit 12 is ensured, and that the volume available for this feed under the disturbed condition depends on the dimensions of the compartment. In particular, this latter is sized in accordance with the maximum time for which the disturbance, i.e. the transverse acceleration, is assumed to exist, and in accordance with the capacity of the pump 13.

In general, it is sufficient to consider permanent acceleration along only one direction of the tank, i.e. acceleration occurring transverse to the running direction of the vehicle when this latter is travelling on bends.

However, in principle, it should be noted that according to the invention it is possible to construct devices able to retain liquid for acceleration in any direction.

In this respect, the small chamber in which the liquid withdrawal pipe opens retains the liquid as long as this is subjected to transverse acceleration in the direction in which the channel passages connecting the chamber to the rest of the tank extend.

For example, the compartment embodiment illustrated in FIG. 3 will be considered, this being analogous to FIG. 2 but showing only the central portion of the tank base.

FIG. 3 shows a compartment 115, this being constituted in the same manner and having the same function as the compartment 15 of FIGS. 1 and 2, equivalent parts being indicated with the same reference numerals.

The walls 17' and 19' extend into walls 18' and 16' parallel to the walls 18 and 16. In this manner, the compartment 115 behaves as the compartment 15 of FIGS. 1 and 2 with regard to acceleration directed along the straight line a—a, but retains the liquid within it even if acceleration occurs parallel to the straight line b—b. Obviously the greater extension of the communication channels between the small chamber 115 and the rest of the tank also makes it more difficult for liquid to enter the chamber 115. Thus, if acceleration along only one direction is assumed, where this acceleration is considered to be of such a duration and extent as to disturb the engine feed, it is sufficient to use forms of the type shown in FIGS. 1 and 2.

Various other wall forms can be conceived for the compartment, such as that illustrated in FIG. 4, this figure again being analogous to FIG. 2. A compartment 215 is provided, with a single gap between the walls 18, 19, which extends between the walls 19 and 19'. In this manner the compartment 215 is able to retain liquid against acceleration along the axis a—a and along the axis b—b if directed downwards with reference to the figure. However, it is more difficult for liquid to enter because of the single gap in the wall, and the compartment 215 loses its symmetry about the axis b—b.

The compartment 15 of FIGS. 1 and 2 can be used favourably in combination with further baffle means disposed in the tank, which increase its effectiveness, in particular by facilitating its filling during the transient state as the transverse acceleration is beginning.

Figure 6:
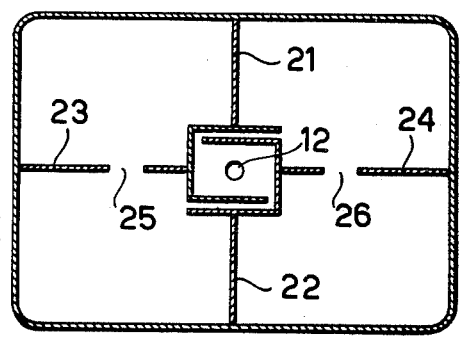

FIGS. 5 and 6 show for example how the compartment 15 can be combined with transverse baffles 21, 22, 23 and 24. The baffles 23 and 24 are traversed by ports 25 and 26 which, together with the passage constituted by the compartment 15, enable the liquid in the tank to assume its own static position with a common free surface in all the sectors. Sudden transverse acceleration causes the liquid to move, so hugging the walls 21 and 22. The liquid in the sectors between the walls 22 and 23 or between the walls 21 and 24 respectively is urged to enter the compartment 15, so supplying it during at least part of the time for which the disturbing phenomenon lasts.

Figure 7:
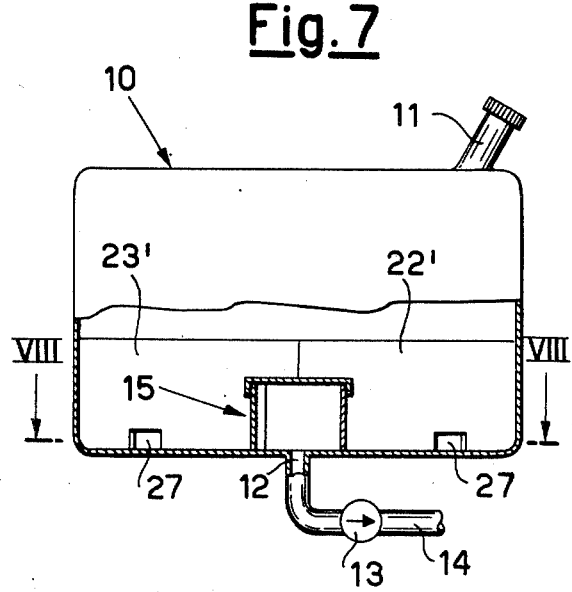
Figure 8:
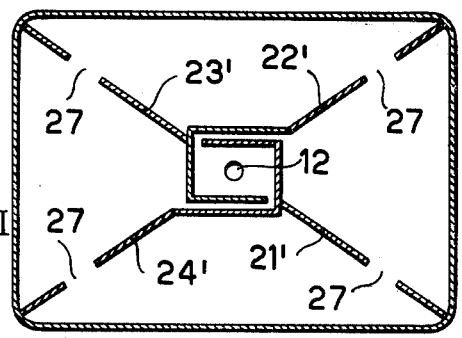

A different baffle arrangement in combination with the compartment 15 is shown in FIGS. 7 and 8, in which the baffles 21', 22', 23' and 24' are laid out diagonally. Under transverse acceleration conditions, the liquid which under static conditions was contained in the sectors between the walls 23' and 24', or 21' and 22' respectively according to the direction of the acceleration, is urged into the compartment 15. In these embodiments, ports 27 are provided in all the baffles 21', 22', 23' and 24', to enable the liquid to become uniformly distributed under static conditions.

Baffles can obviously be provided in the tank for each type of compartment, to facilitate the flow of liquid fuel therein.

Numerous modifications can be made to the configuration of the individual parts of the device, and to their mutual arrangement, but without leaving the scope of the inventive concept.

What is claimed is:

1. A motor vehicle fuel tank at the base of which there opens the mouth of a withdrawal conduit for the fuel fed to the vehicle engine, wherein said mouth is situated in a small chamber contained in the tank, bounded laterally by a baffle and communicating with the rest of the tank via at least one gap in the baffle, this gap extending in the form of a channel formed by parallel walls disposed side-by-side over a length substantially equal to the chamber dimension in the direction parallel to the side-by-side walls, wherein said baffle is of generally rectangular layout, and communicates with the rest of the tank via two gaps situated in proximity to the corners and extending in the form of channels in opposite directions along two opposing sides of the baffle.

2. A tank as claimed in claim 1, wherein the chamber is bounded by two substantially analogous baffle elements of U-shaped horizontal cross-section, mounted in opposing positions and with their branches alternating and side-by-side.

3. A tank as claimed in claim 1, wherein said chamber is closed upperly by a cover.

4. A motor vehicle fuel tank at the base of which there opens the mouth of a withdrawal conduit for the fuel fed to the vehicle engine, wherein said mouth is situated in a small chamber contained in the tank, bounded laterally by a baffle and communicating with the rest of the tank via at least one gap in the baffle, this gap extending in the form of a channel formed by parallel walls disposed side-by-side over a length substantially equal to the chamber dimension in the direction parallel to the side-by-side walls, wherein said chamber is formed in a substantially central position in the tank, and the side walls of the chamber are connected to the tank walls by vertical baffles provided in their lower region with intercommunication ports between the tank regions into which the baffles divide the tank.

5. A tank as claimed in claim 4, having a substantially rectangular horizontal cross-section, said baffles being four in number and disposed substantially along the diagonals.

6. A tank as claimed in claim 4, having a substantially rectangular horizontal cross-section, said baffles being four in number and disposed substantially along the middle axes of the tank.

7. A tank as claimed in claim 4, wherein the baffles have a height exceeding the height of the chamber, and are joined together upperly above the chamber.

* * * * *